United States Patent [19]

Kataoka

[11] Patent Number: 5,668,960
[45] Date of Patent: Sep. 16, 1997

[54] DATA PROCESSING DEVICE WITH MEANS FOR DISPLAYING FILES IN ACCORDANCE WITH APPLICATIONS WITH WHICH THE FILES CAN BE READ

[75] Inventor: Misao Kataoka, Mie-ken, Japan

[73] Assignee: Brother Kogyo Kabushiki Kaisha, Aichi-ken, Japan

[21] Appl. No.: 563,857

[22] Filed: Nov. 29, 1995

Related U.S. Application Data

[63] Continuation of Ser. No. 333,510, Nov. 2, 1994, abandoned.

[30] Foreign Application Priority Data

Nov. 4, 1993 [JP] Japan ................................ 5-301100

[51] Int. Cl.⁶ .................................................. G06F 3/14
[52] U.S. Cl. ................................... 345/333; 345/326
[58] Field of Search ................................. 395/326, 327, 395/328, 329, 330, 331, 332, 333, 334, 340, 348, 352

[56] References Cited

U.S. PATENT DOCUMENTS 5,185,857  2/1993  Rozmanith et al. ............... 395/148
5,212,771  5/1993  Gane et al. ........................ 395/160
5,222,236  6/1993  Potash et al. ..................... 395/600
5,241,645  8/1993  Cimral et al. ..................... 395/500
5,283,864  2/1994  Knowlton ......................... 395/158
5,345,550  9/1994  Bloomfield ....................... 395/156

Primary Examiner—Thomas G. Black
Assistant Examiner—Ruay Lian Ho
Attorney, Agent, or Firm—Kane, Dalsimer, Sullivan, Kurucz, Levy, Eisele and Richard, LLP

[57] ABSTRACT

A data processing device has a data entry device for entering data, a display device for displaying the entered data and a data storage device for storing data as files. The data processing device also has an index actuator for initiating a display of an index of the stored files on the display. Each file has a filename and an extension. The index of the stored files is arranged in a plurality of windows, with each window containing an index of the files having the same extension. The windows are arranged to partially overlap each other. The window which contains an index of the files having an extension corresponding to files readable by a currently operating application, is displayed in front of the other windows.

18 Claims, 12 Drawing Sheets

FIG. 3 tries,Ltd. welcomed H.E.Mr. lery, where historical items, typewriter asslery, where Finally, the gho Factory. They w
Juan Antonio Samaranch Olympic-related materials, line where Olympic-related moved to the brief video and the h
President of the Internation and product samples are dis- typewriters are and product sampl typewriter asslery, where historie
al Olympic Committ... played There Mr Samaranch... in 19 played. There, Mr. line where Olympic related mpipro
and several other gr was presented wit typewriters are and product sampl
its headquarters. Olympic athletic j
After being greete broider

| WPT Create Document | SPR Spread sheet | MRG Address book |
|---|---|---|
| ★NEWTEXT | NOPQR .WPT | ABCDEFGH .WPT |
| IJKL-M .WPT | STUV_WXY .WPT | IJKL-M .WPT |
| NOPQR .WPT | YZ.WPT .WPT | ABCD-88 .WPT |
| ABCD-81 .WPT | ABCD-82 .WPT | ABCD-83 .WPT |
| HIDE-3S .WPT | HIDE-3N .WPT | HIDE-38 .WPT |
| HIDE-3I .WPT | HIDE-3U .WPT | |

On May 8, Brother Indus- ho Factory. They viewed a
tries,Ltd. welcomed H.E.Mr. brief video and toured the gal
Juan Antonio Samaranch lery, where historical items,
President of the Internation- Olympic related materials,
and product samples are dis-

《 INDEX 》

| | | | | |
|---|---|---|---|---|
| AAAAA | .WPT | BBBBB | .WPT | CCCCC | .WPT |
| DDDDD | .WPT | EEEEE | .WPT | FFFFF | .WPT |
| GGGGG | .WPT | HHHHH | .WPT | AAAAAA | .WPT |
| BBBBBB | .SPR | CCCCCC | .SPR | DDDDDD | .SPR |
| EEEEEE | .SPR | FFFFFF | .SPR | GGGGGG | .SPR |
| HHHHHH | .SPR | IIIII | .SPR | JJJJJ | .SPR |
| EEEEEE | .SPR | AAAAA | .MRG | BBBBB | .MRG |

FIG. 9
PRIOR ART

DATA PROCESSING DEVICE WITH MEANS FOR DISPLAYING FILES IN ACCORDANCE WITH APPLICATIONS WITH WHICH THE FILES CAN BE READ

This application is a continuation of application Ser. No. 08/333,510, filed Nov. 2, 1994, now abandoned.

BACKGROUND OF THE INVENTION

The present invention relates to a data processing device, and more particularly, to a device which displays the names of files having similar file types together in a window.

Figure 8:
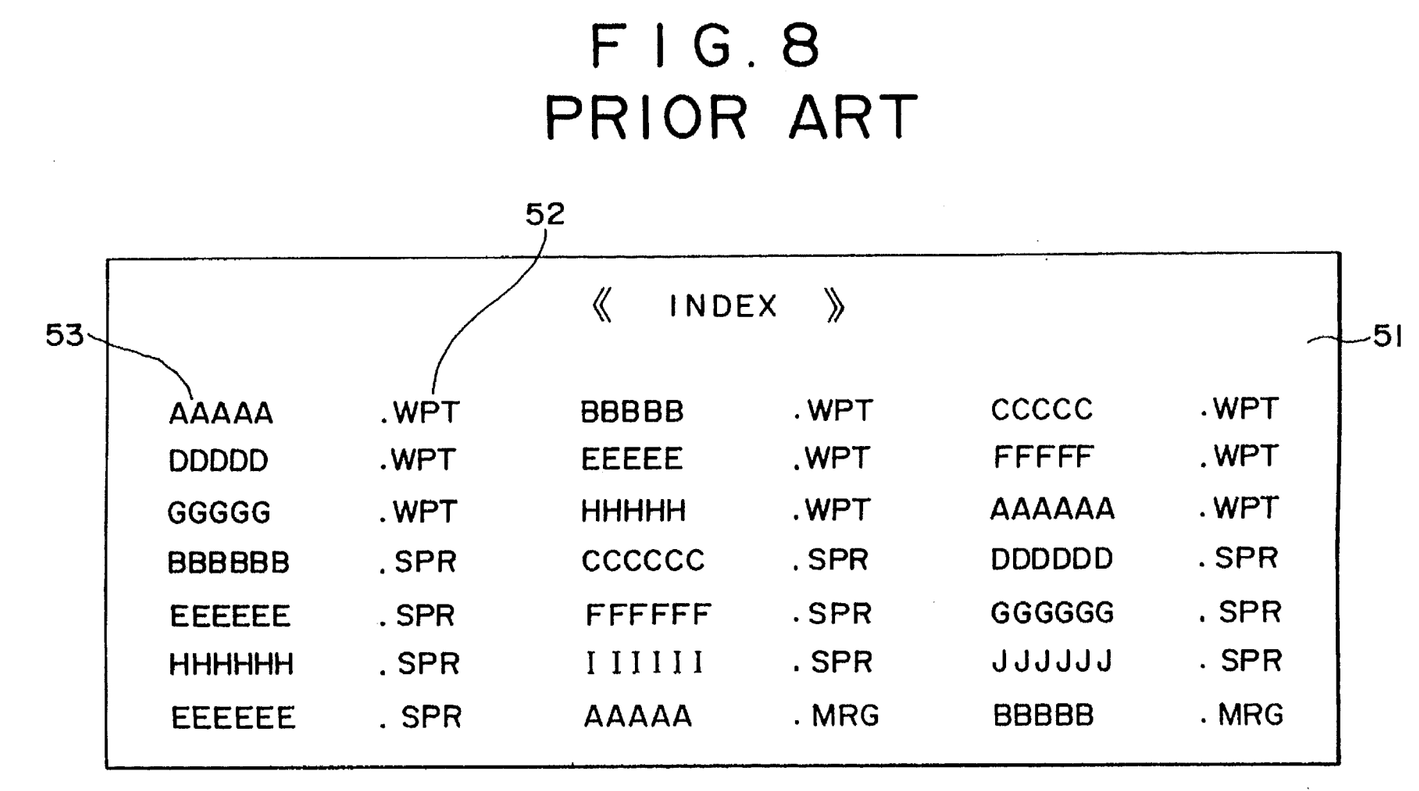
FIG. 8 shows a screen image of a conventional data processing device.
Figure 9:
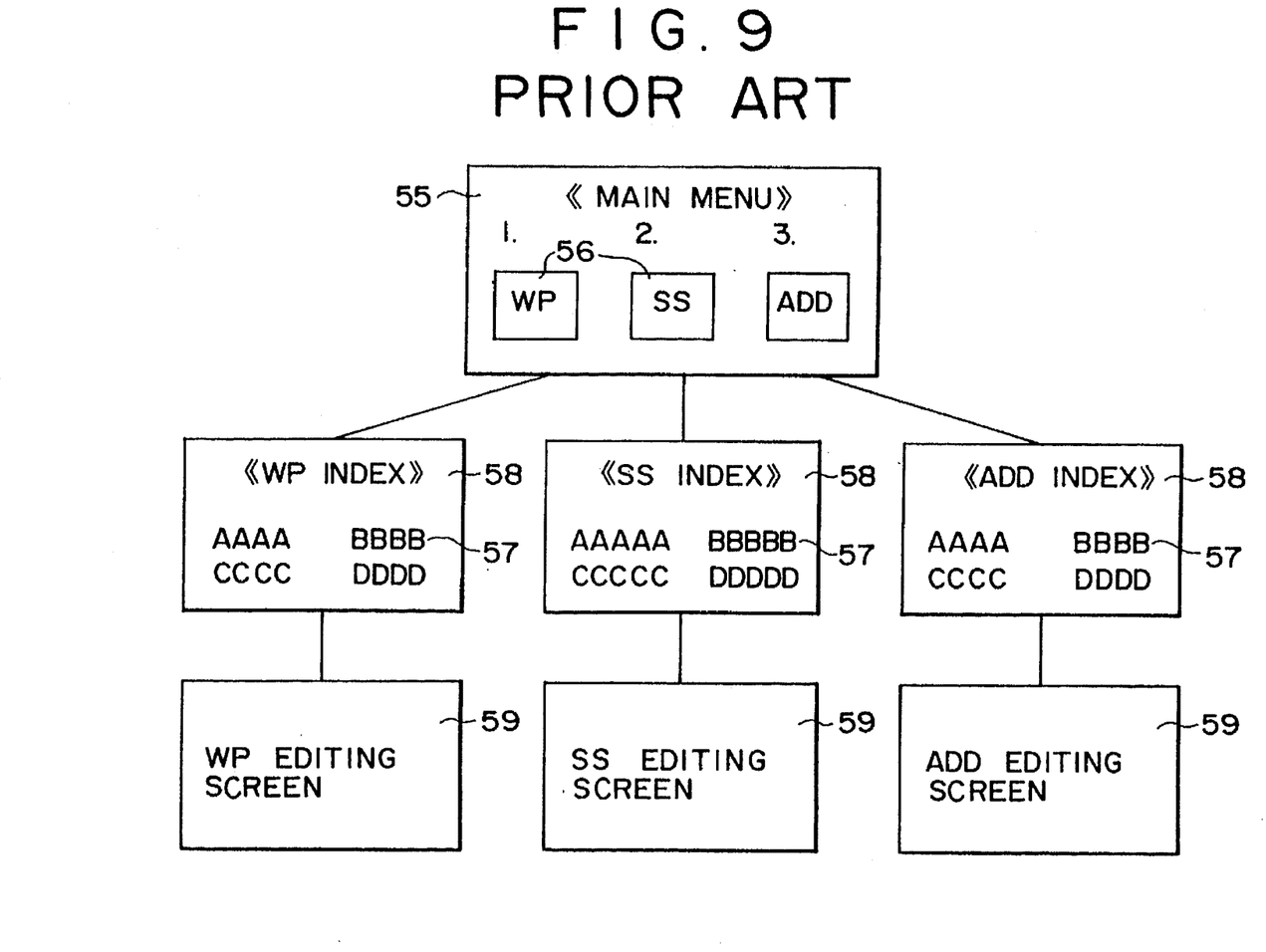
FIG. 9 is a screen image of another conventional data processing device.

In a conventional data processing device, the files are named with a filename and an extension, with files of a similar type having similar extensions. Generally in this device, the names of the files are sorted in accordance with their extensions as shown in FIG. 8. Another data processing device uses a more complicated method of sorting files in accordance with their extensions, as shown in FIG. 9. In this device application icons 56 are displayed in a main menu screen 55. When one of the applications is selected, the name of files 57 which can be processed by the selected application are displayed on the index display screen 58. If an operator selects one of the files on the index display screen 58, the application is activated and the selected file is opened.

In the former type of device, since the file names are displayed on the screen in a predetermined order, and if the number of the files exceeds the number which can be displayed on one screen, the screen must be scrolled in order to view all the files. This reduces the efficiency of finding files, since many files must be searched before a desired file can be found.

In the latter type of device, in order to see the names of files readable by another application, when the file names readable of one application is displayed, the current screen must be closed once, and the main screen must be displayed again. Thus, the second type of device also reduces the efficiency of finding desired files.

SUMMARY OF THE INVENTION

It is therefore an object of the present invention to provide an improved data processing device which can display the names of files readable by various applications, allowing an operator to find the desired file within a relatively short period of time.

According to an aspect of the present invention, there is provided a data processing device comprising:

a data entry device for entering data;

a display device for displaying the entered data;

a data storage device for storing the data as files; and an index actuator for initiating a display of an index of the files stored in the storage device on the display, wherein each of the files has a filename and an extension name, wherein the index of the stored files is arranged in a plurality of windows, each of the windows containing an index of files having a similar extension, the windows arranged to partially overlap each other, and wherein one of the windows which contains an index of the files having an extension corresponding to files readable by a currently operating application, is displayed in front of the other windows.

According to another aspect of the present invention, there is provided a method of displaying an index of files stored in a storage device of a data processing device, the method comprising the steps of:

reading names and extensions of files stored in the storage device;

displaying an index of the file names in windows, each of the window containing an index of the file names having similar extensions; and displaying the windows to overlap each other, wherein one of the windows which contains an index of the files having an extension corresponding to files readable by a currently operating application, is displayed in front of the other windows.

According to a further aspect of the present invention, there is provided a data processing device which can operate a plurality of applications, the data processing device comprising:

a data storage device for storing a plurality of files, each of the files is readable by one of the applications;

a display for displaying a plurality of windows, each of the windows partially overlapping the other windows, each of the windows containing a list of names of the files which can be read by one of the applications; and a controller for controlling an active window having a list of names of the files readable by a currently operating application to be displayed in front of the other windows.

DESCRIPTION OF THE EMBODIMENTS

Figure 1:
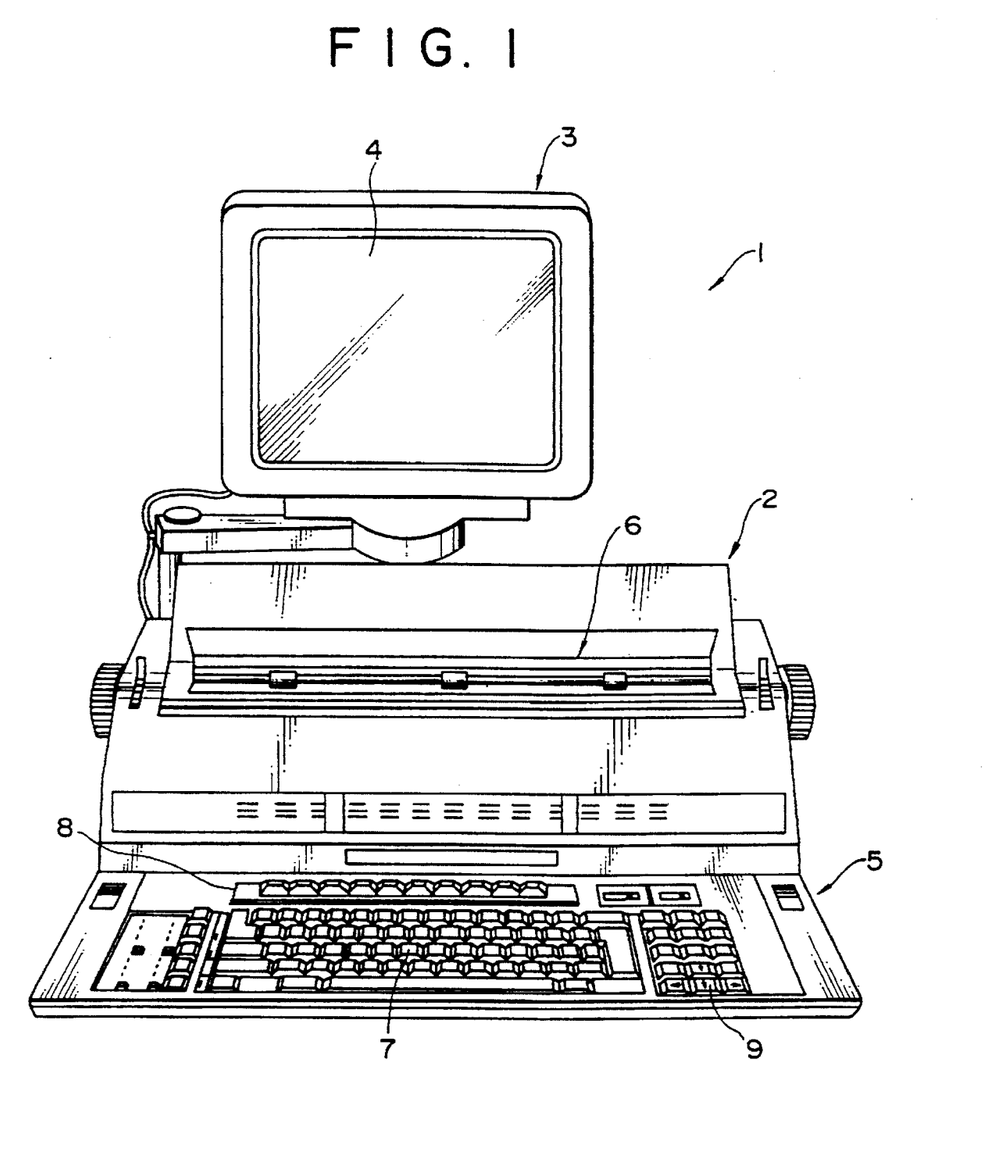
FIG. 1 is a data processing device embodying the present invention.

FIG. 1 is a data processing device embodying the present invention. The data processing device 1 has an electronic typewriter 2 and a display device 3. The display device 3 has a screen 4 on which text data, screen menus, etc., are displayed. The electronic typewriter 2 is provided with a keyboard 5 and a printer 6, and can be used independent of the display device 3. The keyboard 5 is provided with alphanumeric keys 7, function keys 8 including a menu key for displaying a pull-down menu on the screen 4, and cursor keys 9 for moving a cursor on the screen 4.

Figure 2:
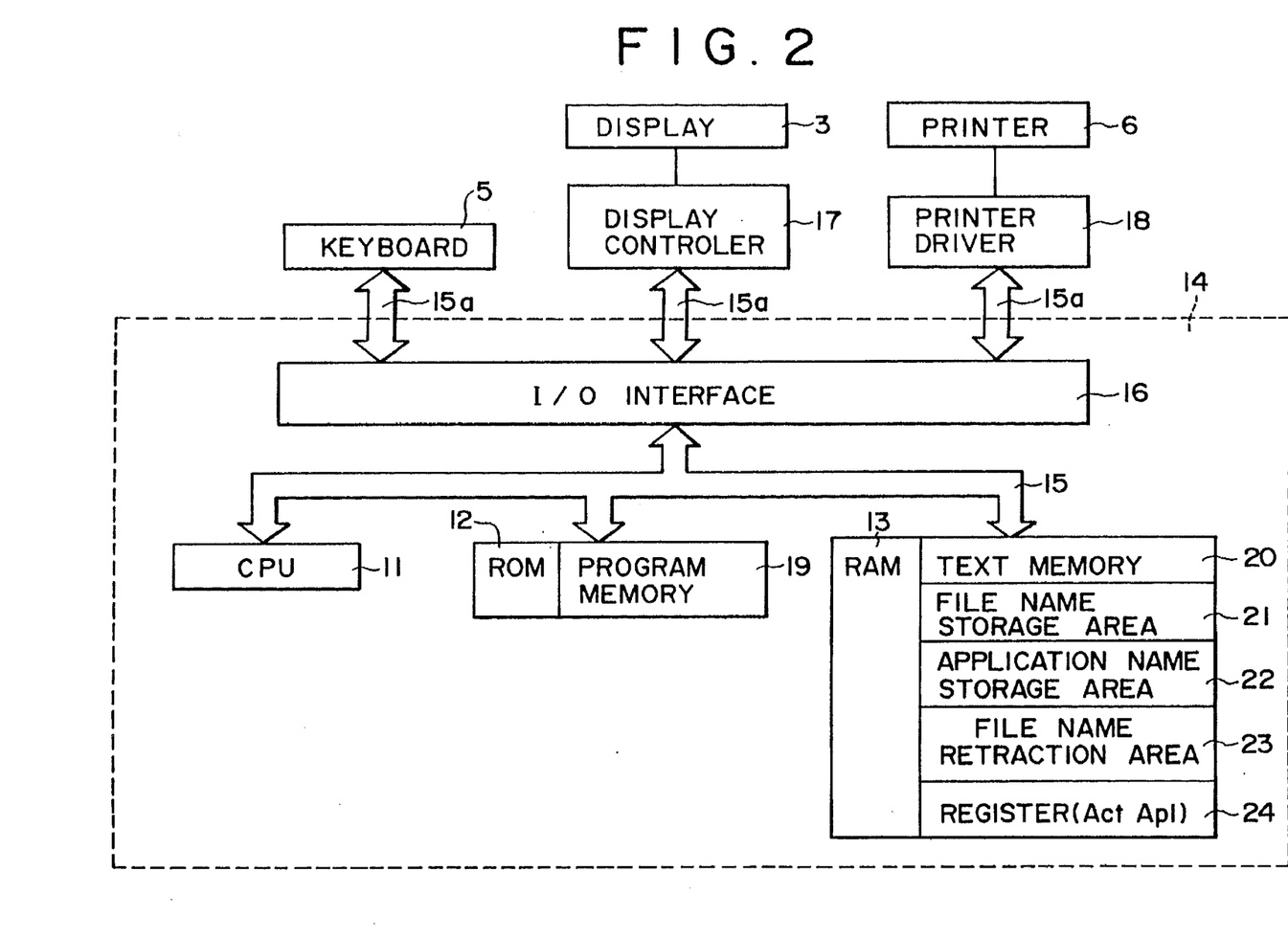
FIG. 2 is a block diagram illustrating the control system of the data processing device shown in FIG. 1.

FIG. 2 is a block diagram illustrating the control system of the data processing device. The control system of the data processing device has a microprocessor 14 provided with a CPU 11, ROM 12 and a RAM 13 connected through an internal bus 15. Further, the keyboard 5, a display controller 17 and a printer driver 18 are connected through peripheral bus 15a and an interface 16, to the microprocessor 14.

The display controller 17 drives the display 3, and the printer driver 18 drives the printer 6.

A program memory 19, which stores programs for controlling various operations of the data processing device 1, is provided in the ROM 12. An index displaying control program for displaying the file names according to their file type is also stored in the program memory 19.

The RAM 13 comprises a text memory 20, a file name storage area 21, an application name storage area 22, a file name retraction area 23, and a register 24.

The text memory 20 stores code data inputted by the keyboard 5, while the file name storage area 21 stores the name of files displayed on the screen 4. The application name storage area 22 stores the name of an application which is currently operating. The file name retraction area 23 stores the names of files and sorts the file names according to file type. In the present embodiment, the file names are sorted according to their extensions. The register 24 stores the variable ActApl which represents the application name. In this embodiment, ActApl=0 represents a word processor, ActApl=1 represents a spreadsheet, and ActApl=2 represents an address book.

Figure 3:
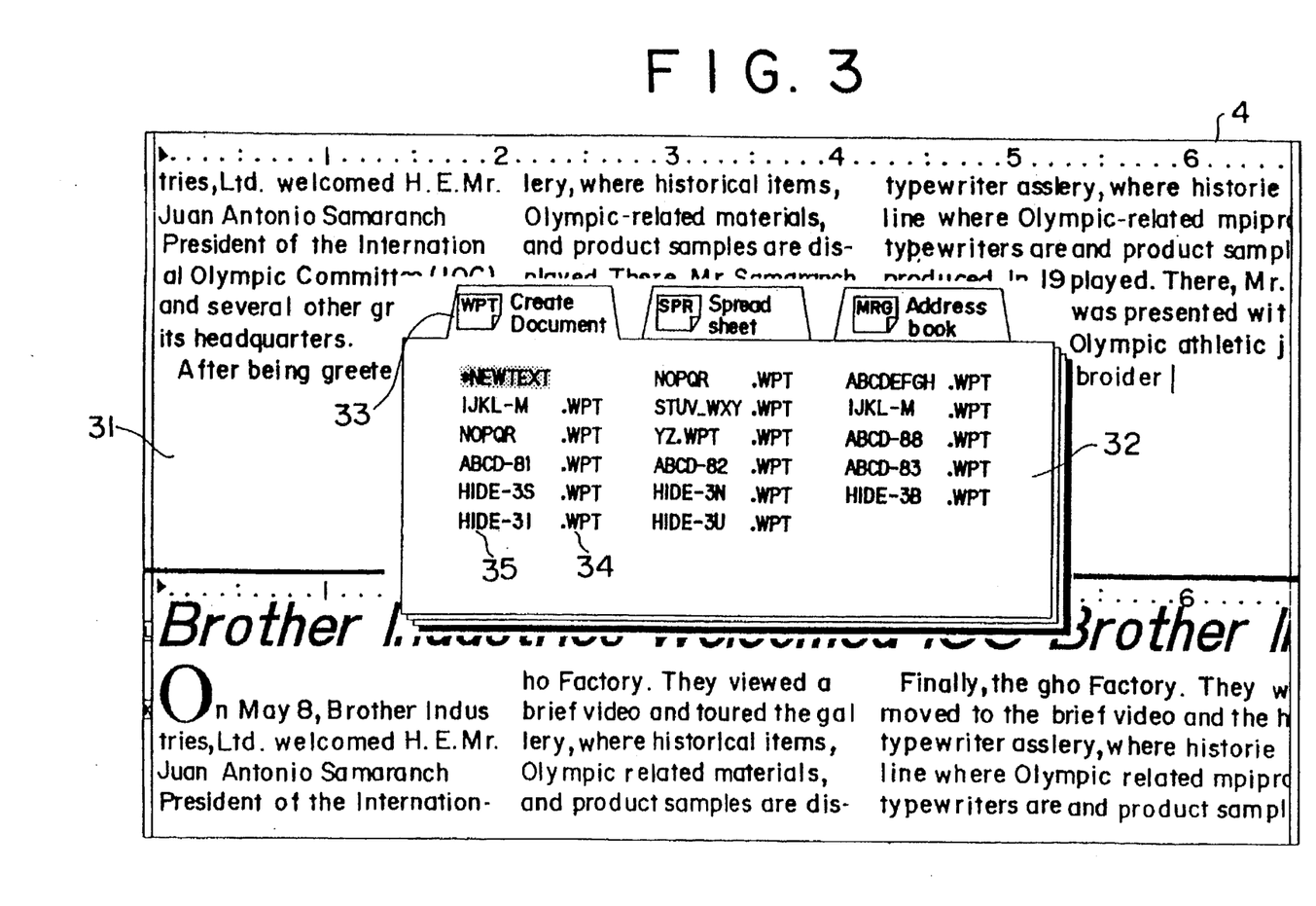
FIG. 3 is a screen image of the data processing device shown in FIG. 1.

FIG. 3 is an example of an image displayed on the screen 4. If a key which actuates the index display mode is operated, a file name window 32 displays the names of files having the file type which is readable by the application currently operating. Further, the file window 32 is overlaid on top of the contents of the file currently being edited. The file name window 32 has a index tag 33 on which the name of the application is displayed. In the file name window 32, the names of the files 32 having a similar extension 34 (and therefore file type) are displayed. As shown in FIG. 3, a word processing document is currently being edited, and therefore files which are readable by the word processing program are displayed in the file window 32.

FIGS. 4A through 4D show a flowchart illustrating an indexing mode of the data processing device. When the menu key 8 is depressed, a menu (not shown) is pulled down on the screen 4. In the menu list, if "OPEN FILE" is selected, the index display control starts.

Figure 4A:
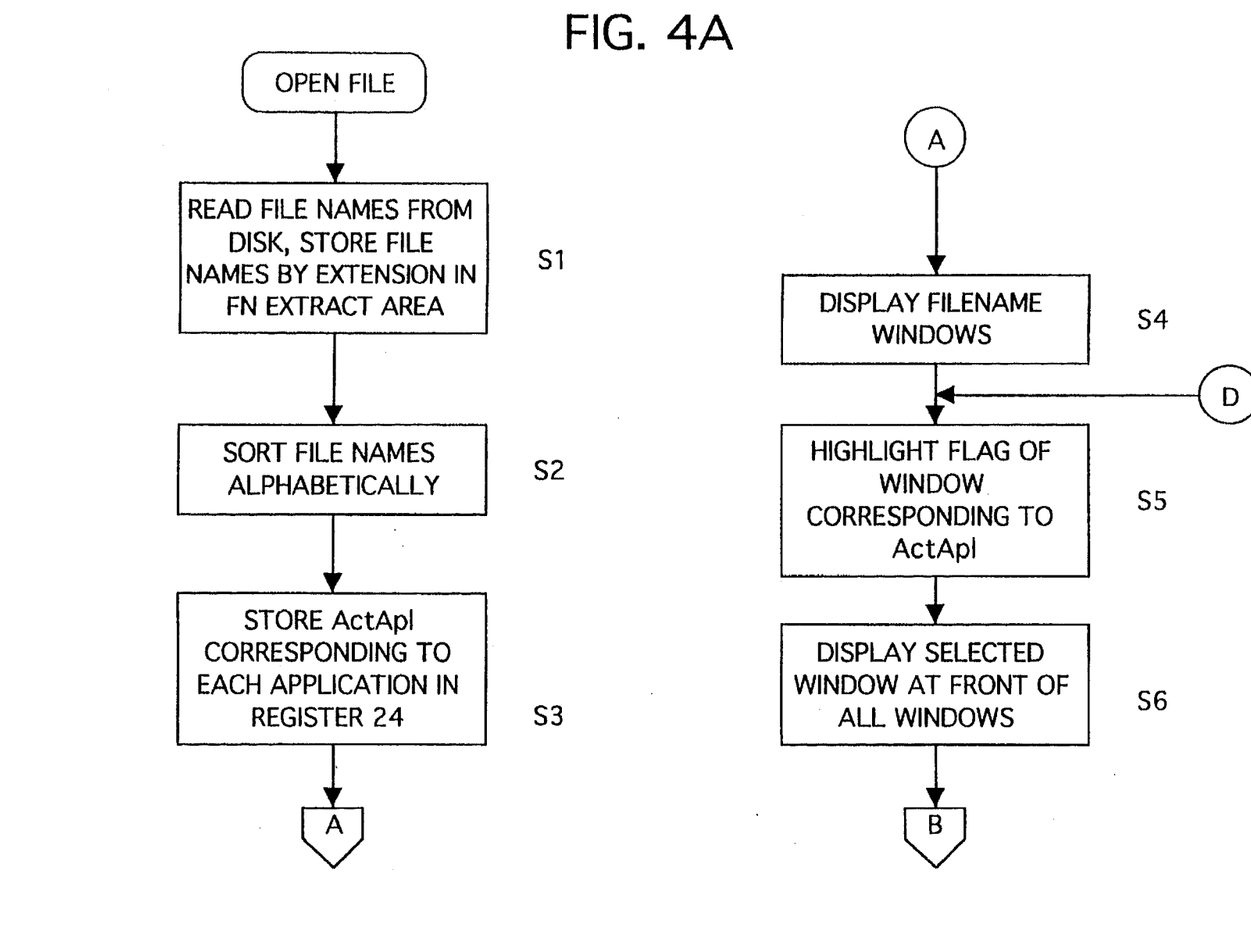
FIGS. 4A, 4B, 4C and 4D show a flowchart illustrating an indexing mode of the data processing device shown in FIG. 1.

In step S1 of the index display control, the names of files stored on a storage medium such as a disk are read, then sorted by extension and stored in the file name extract area 23 in the RAM 13. In the present embodiment, the file names stored have the extensions "WPT", "SPR" or "MRG". Then in step S2 the file names are sorted alphabetically, having already been sorted by extension in step S1. Then in step S3, the value of ActApl, corresponding to the application currently operating, is read from the application name storage area 22, and stored in the register 24.

Figure 6:
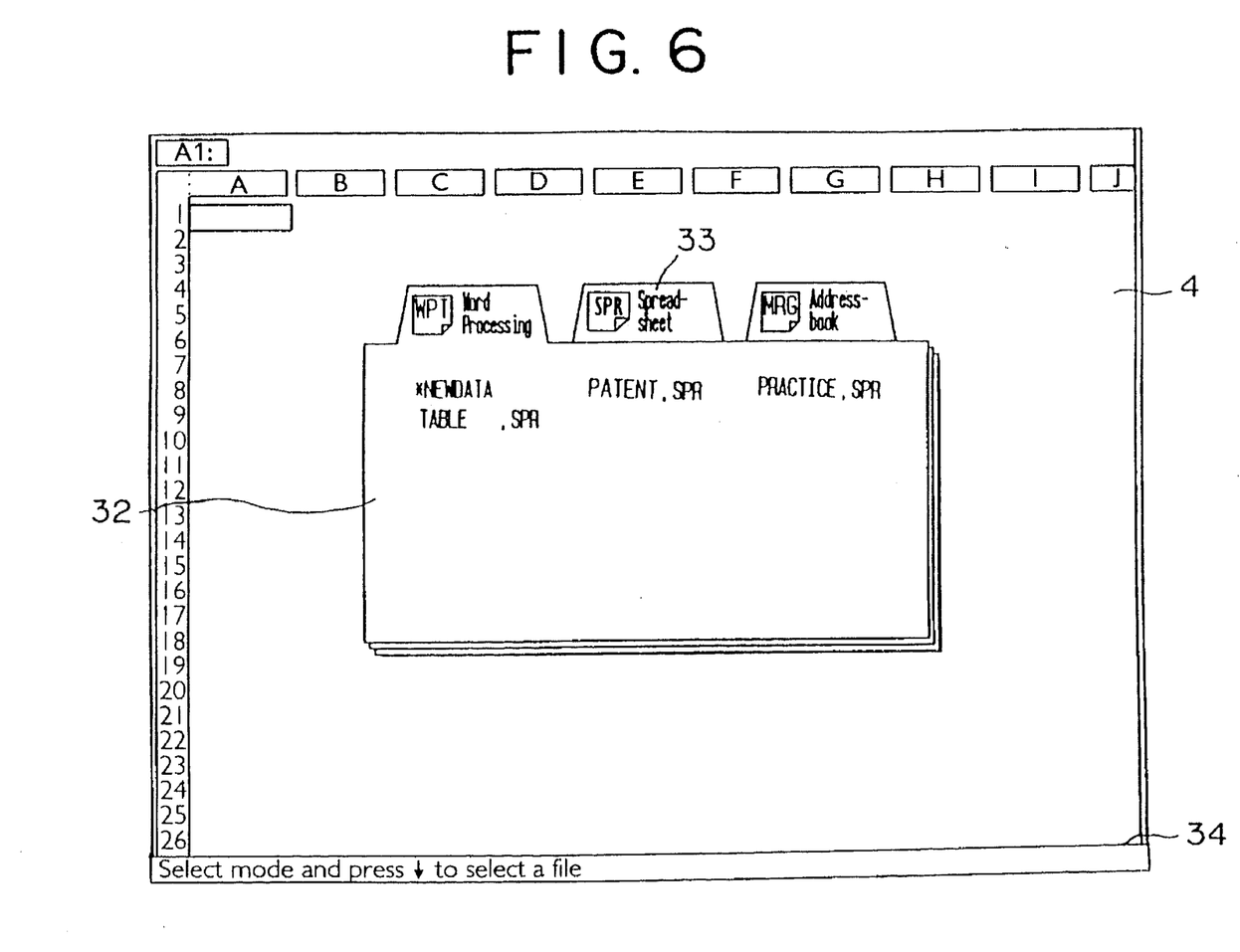
FIG. 6 is another screen image displayed in the indexing mode.

The in step S4, as shown in FIG. 3, the file name display windows 32 for each application are displayed one on top of another, with the top window 32 listing the file names that can be read by the currently operating application. Then in step S5, as shown in FIG. 6, the index tag 33 corresponding to the application indicated by the variable ActApl is highlighted. Then in step S6, the window 32 corresponding to the currently operating application (as indicated by the variable ActApl) is moved to the front (i.e., made the active window). Also in step S6 the names of the files which can be read by the application are read out of the file name retract area 23, and displayed in the window.

Figure 5:
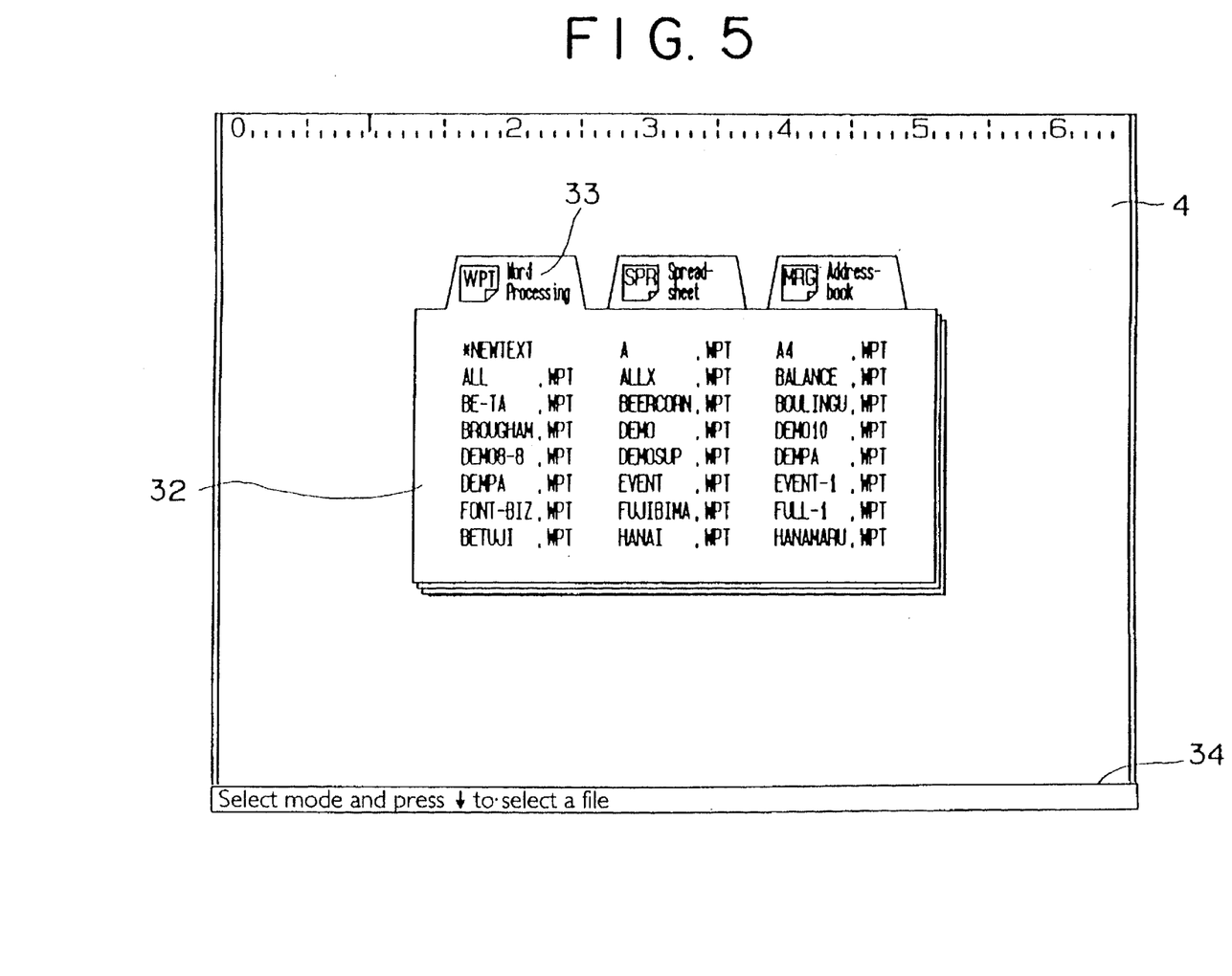
FIG. 5 is a screen image displayed in the indexing mode.
Figure 7:
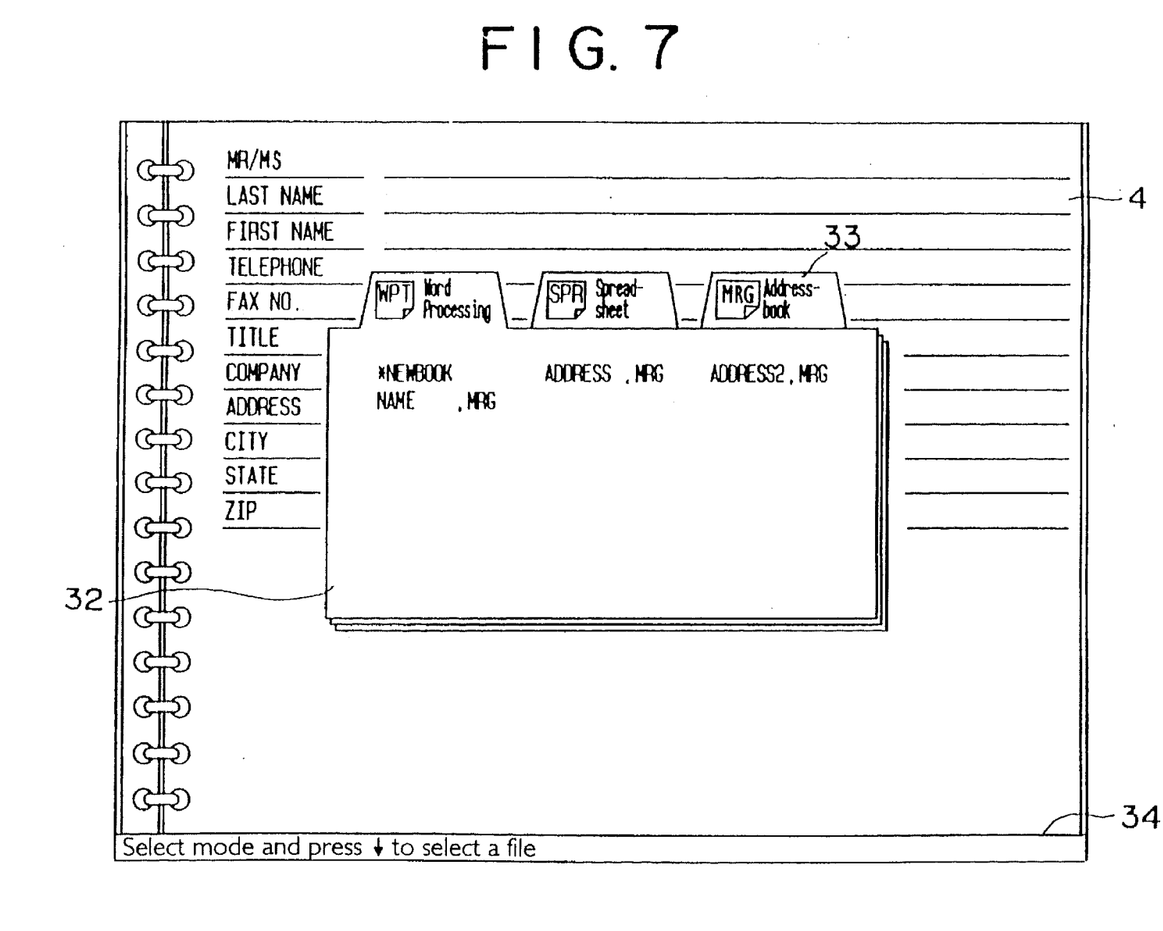
FIG. 7 is a third screen image displayed in the indexing mode.

As described above, the names of the files for the application stored in the application name storage area 22 are listed in one window as shown in FIGS. 5 through 7.

If the above process is executed when text is being edited on the screen 4, since the variable ActApl is set to "0" (zero), a window listing the files for a word processor are made active (i.e., moved to front). Simultaneously, the index tag 33 indicating the word processor is highlighted, and at the lower portion of the screen, a message saying "Select mode and press ↓ to select a file" is displayed.

Similarly, if a spreadsheet is edited on the screen 4 when the index mode is actuated, since the variable ActApl is set to 1, the window 32 listing the files for the spreadsheet program is made active as shown in FIG. 6, and the index tag 33 indicating the spreadsheet is highlighted. Further, if the address book file is being edited when the index mode is selected, the window for the address book is made active and the index tag 33 indicating the address book is highlighted, as shown in FIG. 7.

Then in step S7, the program waits until key input has been made. If a key has been pressed, then step S8 determines whether the return key or down cursor key have been pressed.

Figure 4B:
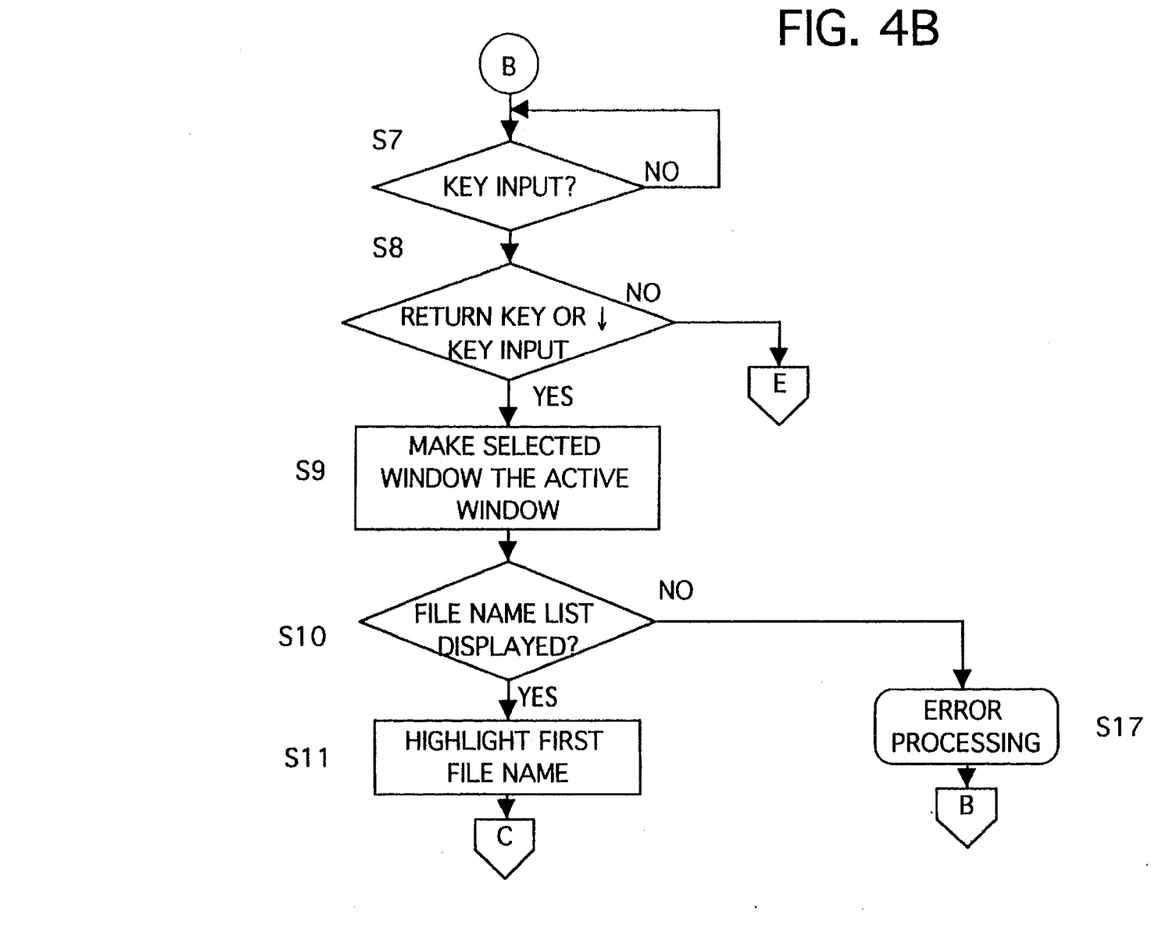

If the return key or down cursor key has been input (S8:YES) the window having the index tag 33 which has been highlighted is made the active window in step S9. Then a file name list is displayed in step S10, and the first file name is highlighted in step S11. If the file name list is not displayed (S10:NO), an error process is executed in S17 and control returns to S7.

Then in step S12, the program waits until key input has been made. If a key has been pressed, then step S13 determines whether the return key has been pressed.

If the return key has been input (S13:YES) then data corresponding to the highlighted file name is read from the disk in step S14, and the value of the ActApl which is stored in the register 24 is stored in the application name storage area 22, in step S15. Then in step 16, the data read in step S14 is displayed on the screen 4 for editing.

Therefore, as described above, a desired file can be opened using a simple operation.

Figure 4C:
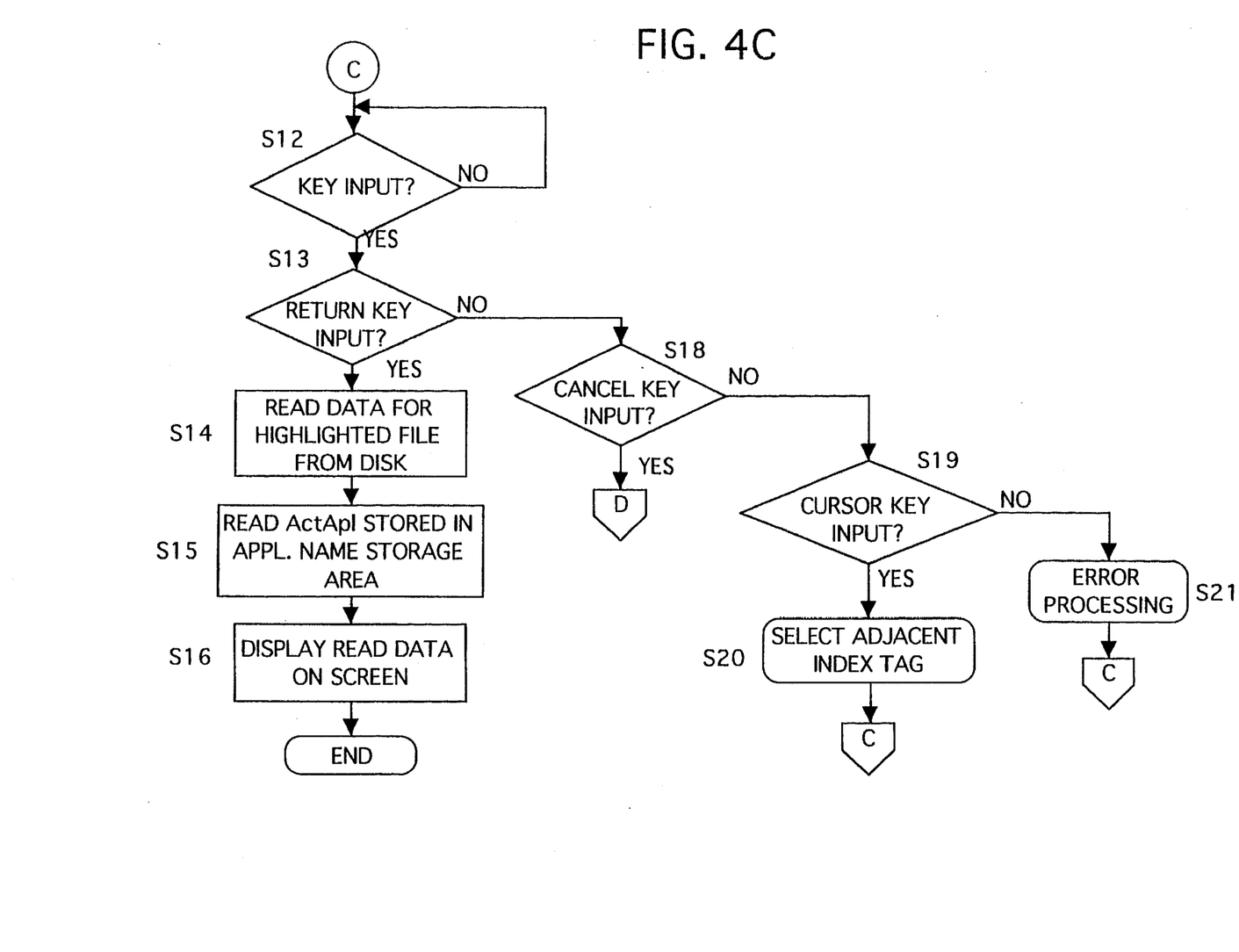

If the return key is not depressed and a cancel key is depressed (S13:NO, S18:YES), then control returns to S5 where the index tag 33 is highlighted. If the cancel key is not depressed (S18:NO) then step S19 determines whether a cursor key has been depressed. If a cursor key has been depressed then the index tag 33 of a file window adjacent to the current file window, is highlighted.

Figure 4D:
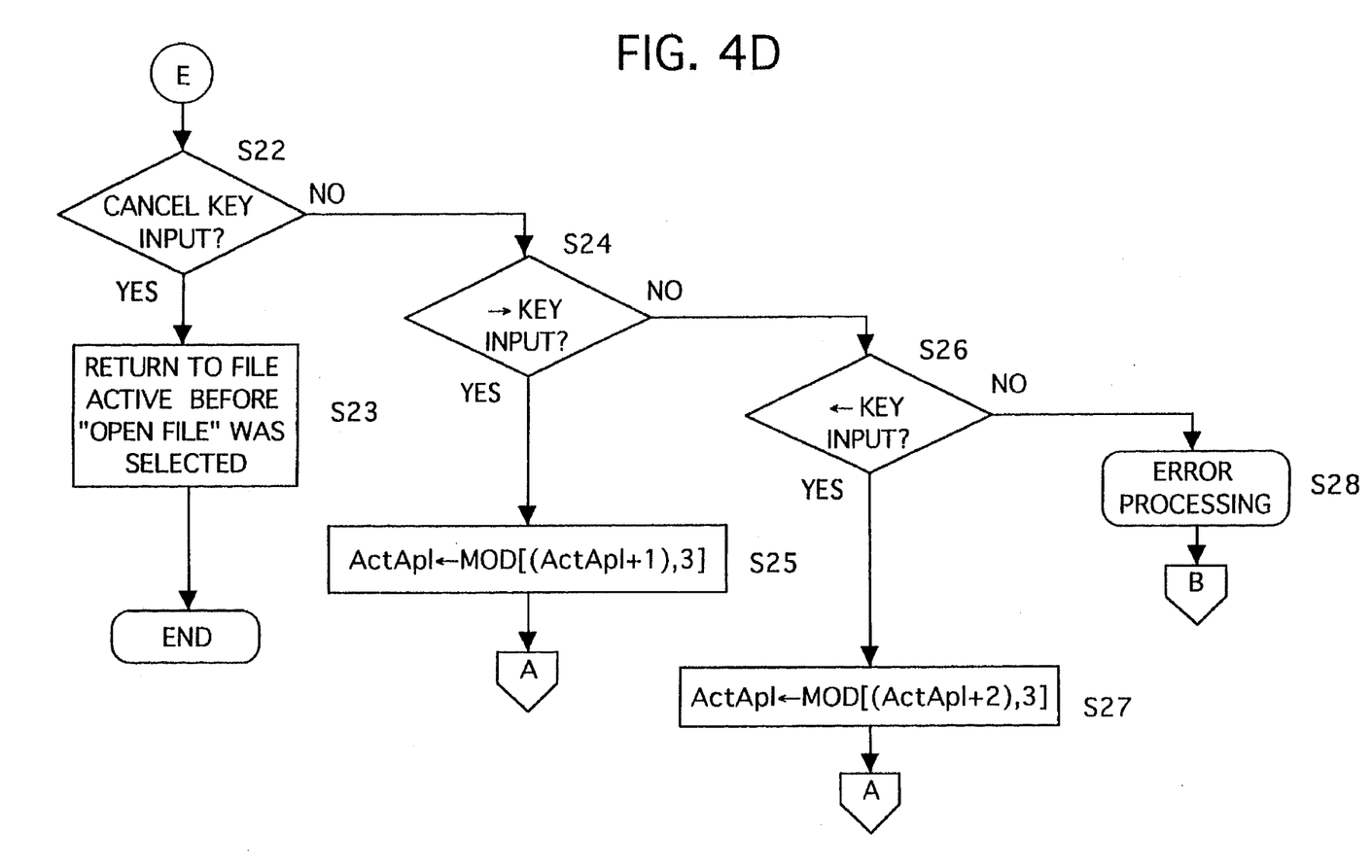

If the return key or the down cursor key is not depressed and the cancel key is depressed (S8:NO, S22:YES), then the index mode is canceled, and the file window is closed, in step S23. Further, editing of the file active before "OPEN FILE" was selected, can be continued.

However, if at step S22, the cancel key is not depressed, the steps S24 and S25 determine whether the right or left cursors key, respectively, were depressed. If the either of the left or right cursor keys are depressed, the variable ActApl stored in the register 24 is rewritten. If the right cursor key is depressed (S24:YES), then ActApl is rewritten with MOD[(ActApl+1),3] in step S25, and control goes to step S4. In this step the MOD[X,N] operator is an X modulo N arithmetic operator (where X=ActApl+1, N=3). Therefore by depressing the right cursor key, ActApl cycles through the values 0,1,2 in order. If the left cursor key is depressed (S26:YES), then ActApl is rewritten with MOD[(ActApl+2),3] in step S27, and control goes to step S4. Therefore, by depressing the left cursor key, ActApl cycles through the values 0,1,2 in reverse order.

If neither the right or left cursor is depressed, the error processing is carried out in step S28 and control goes to step S7.

By depressing the right or left cursor, the file window listing the file names can be switched to one corresponding to a desired application. For example, for the screen image shown in FIG. 5, by depressing the right cursor key once, or the left cursor key twice, the file window displaying files readable by the spreadsheet program, is made active.

In the embodiment described above, three applications are used. However, the number and types of applications is not limited to those described above. Therefore the number of file windows displayed will correspond to the number of applications that are available in the data processing device.

As illustrated in the embodiment, by listing the names of the files according to file type in different file windows, the efficiency of finding a desired file is increased. Further, if a file having a different file type, corresponding to a different application is desired, it is a simple operation to change the active file window, by merely using the cursor keys. Therefore, the accessing of all files can be accomplished quickly and efficiently.

What is claimed is:

1. A data processing device comprising:

a plurality of applications;

a data entry device for entering data;

a display device for displaying said entered data;

a data storage device for storing said data as files, each of said files having a file name and an extension name, said extension name being indicative of an application with which said file can be read;

an index actuator for initiating a display of an index of said file names of said files stored in said storage device on said display device;

wherein each of said files has a file name and an extension name, means for arranging said index of said file names in a plurality of windows displayed on said display device, said plurality of windows being in one-to-one correspondence with said plurality of applications each of said windows containing an index of said file names having a similar extension, said windows arranged to partially overlap each other, said arranging means further arranging one of said windows which contains an index of said file names having an extension corresponding to files readable by a currently operating application, to be displayed in front of the other of said windows.

2. The data processing device according to claim 1, further comprising:

a memory for storing a number corresponding to said currently operating application, and means for determining which of said windows is displayed in front of the other windows in accordance with said number stored in said memory.

3. The data processing device according to claim 1, wherein said windows are displayed to overlay a screen image that was being displayed before said index actuator was actuated.

4. The data processing device according to claim 1, wherein each of said windows has an index tag, each of said index tags containing a name of an application program, and wherein each of said index tags is displayed on said display in its entirety.

5. The data processing device according to claim 4, further comprising:

means for highlighting said index tag of a window with a cursor, said highlighting means highlighting an index tag of a front window in response to an actuation of said index actuator; and keys for moving said cursor amongst said index tags, wherein said arranging means arranges said plurality of windows such that said window containing said index tag highlighted by said highlighting means, is placed in front of the other of said windows.

6. A method of displaying an index of files stored in a storage device of a data processing device having a plurality of applications, said method comprising the steps of:

reading names and extensions of files stored in said storage device, said extensions being indicative of an application with which said file can be read;

displaying an index of said file names in a plurality of windows, in a one-to-one correspondence with said plurality of applications, each window containing an index of said file names having similar extensions; and displaying one of said windows which contains an index of said files having an extension corresponding to files readable by a currently operating application in front of the other of said windows.

7. The method of claim 6, wherein said step of displaying an index comprises the steps of:

sorting said file names according to said extension; and storing said sorted file names in a memory, wherein an index of said sorted file names having similar extension and stored in said memory is displayed in each of said windows.

8. The method of claim 6, which further comprises the step of displaying an index tag on each of said windows, wherein said index tag contains a name corresponding to an application program, and wherein said index tag is displayed in its entirety.

9. The method of claim 6, wherein said windows are displayed to overlay a screen image that was being displayed before said windows were displayed.

10. A data processing device which can operate a plurality of applications, said data processing device comprising:

a data storage device for storing a plurality of files, each of said files being readable by one of said applications;

a display for displaying a plurality of windows, said plurality of windows being in one-to-one correspondence with said plurality of applications each of said windows partially overlapping the other of said windows, each of said windows containing a list of names of said files which can be read by one of said applications; and a controller for controlling an active window having a list of names of said files readable by a currently operating application to be displayed in front of the other of said windows.

11. The data processing device according to claim 10, comprising:

a memory for storing a number corresponding to said currently operating application; and means for determining which of said windows is displayed in front of the other windows in accordance with said stored number.

12. The data processing device according to claim 10, wherein said windows are displayed to overlay a screen image that was being displayed before said windows were displayed.

13. The data processing device according to claim 10, wherein each of said windows has an index tag, each of said index tags containing a name of an application program, and wherein each of said index tags is displayed on said display in its entirety.

14. The data processing device according to claim 13, wherein said controller actuates a cursor to be displayed on said index tag of a front window, and wherein said data processing device further comprises keys for initiating said controller to move said cursor, amongst said index tags, wherein when said cursor is positioned at an index tag other than said index tag of said front window, said window containing said index tag highlighted by said cursor, is placed in front of said windows.

15. A data processing device which can operate a plurality of programs, said data processing device comprising:

means for categorizing a plurality of files by file names in accordance with the programs which can access said files;

means for displaying a plurality of windows, said plurality of windows being in one-to-one correspondence with said plurality of programs and being displayed partially overlapped, each of said plurality of windows containing file names of files which can be accessed by the same one of said programs;

means for designating one of said plurality of windows; and means for controlling said displaying means to arrange said plurality of windows such that said designated one of said plurality of windows is in front of the other of said windows.

16. The data processing device according to claim 15, further comprising means for determining which of said programs is currently being operated, said designating means designating said one of said plurality of windows in accordance with the program that is currently operating as determined by said determining means.

17. The data processing device according to claim 15, wherein each of said windows has an index tag, each of said index tags containing a name of one of said operating programs, and wherein each of said index tags is displayed on said display in its entirety.

18. The data processing device according to claim 17, further comprising:

means for highlighting said index tag of a window with a cursor, said highlighting means highlighting an index tag of a front window in response to said designating means designating said one of said plurality of windows; and keys for moving said cursor amongst said index tags, wherein said controlling means arranges said plurality of windows such that said window containing said index tag highlighted by said highlighting means, is placed in front of the other of said windows.

* * * * *